(12) United States Patent
Grigoletto et al.

(10) Patent No.: US 10,655,087 B2
(45) Date of Patent: May 19, 2020

(54) POLISH REMOVER FORMULATIONS

(71) Applicant: RHODIA POLIAMIDA E ESPECIALIDADES S.A., Sao Paulo (BR)

(72) Inventors: Fernanda Grigoletto, Campinas/São Paulo (BR); Sergio Martins, Campinas/São Paulo (BR); José Roberto Mariussi, Campinas/São Paulo (BR); Suelbi Silva, Hortolandia/São Paulo (BR)

(73) Assignee: RHODIA POLIAMIDA E ESPECIALIDADES S.A., São Paulo (BR)

( * ) Notice: Subject to any disclaimer, the term of this patent is extended or adjusted under 35 U.S.C. 154(b) by 0 days.

(21) Appl. No.: 16/069,960

(22) PCT Filed: Jan. 14, 2016

(86) PCT No.: PCT/IB2016/000014
§ 371 (c)(1),
(2) Date: Jul. 13, 2018

(87) PCT Pub. No.: WO2017/122037
PCT Pub. Date: Jul. 20, 2017

(65) Prior Publication Data
US 2019/0078037 A1   Mar. 14, 2019

(51) Int. Cl.
*C09D 7/00* (2018.01)
*C09D 7/20* (2018.01)
*C11D 3/20* (2006.01)
*C09D 9/00* (2006.01)
*C11D 11/00* (2006.01)

(52) U.S. Cl.
CPC ............ *C11D 3/2096* (2013.01); *C09D 9/005* (2013.01); *C11D 11/0023* (2013.01)

(58) Field of Classification Search
CPC .... C08G 18/542; C08G 18/42; C09D 175/04; C09D 101/18; C09D 133/00; C09D 167/00; C09D 179/04; C09D 7/20; B22C 1/2273; C07D 317/24
See application file for complete search history.

(56) References Cited

U.S. PATENT DOCUMENTS

| | | | |
|---|---|---|---|
| 3,073,706 A | 1/1963 | Treboux et al. | |
| 2010/0137480 A1* | 6/2010 | Denilson ............ | C08G 18/2815 524/108 |
| 2014/0031271 A1 | 1/2014 | Lourenco | |

FOREIGN PATENT DOCUMENTS

| KR | 20140121120 A | 10/2014 |
|---|---|---|
| WO | 2011086421 A1 | 7/2011 |
| WO | 2011143242 A2 | 11/2011 |
| WO | 2014047428 A1 | 3/2014 |
| WO | 2014125357 A1 | 8/2014 |

\* cited by examiner

*Primary Examiner* — Haidung D Nguyen
(74) *Attorney, Agent, or Firm* — Osha Liang LLP

(57) ABSTRACT

The present invention relates to a polish remover formulation. The present invention more specifically focuses on the use of a blend of glycerol ketals and/or acetals in polish remover formulations, notably for promoting the polish removing performances.

6 Claims, No Drawings

POLISH REMOVER FORMULATIONS

This application is a U.S. national stage entry under 35 U.S.C. § 371 of International Application No. PCT/162016/000014 filed 14 Jan. 2016, the entire disclosure of this application is hereby incorporated herein by reference.

The present invention relates to polish remover formulations. The present invention more specifically focuses on the use of a blend of glycerol ketals and/or acetals in polish remover formulations, notably for promoting the performance of polish removers.

BACKGROUND OF THE INVENTION

A large variety of polish formulations intended for polishing floor surfaces is known in the art. These polish formulations usually contain mainly resins, surfactants, plasticizers, coalescents, solvents, fragrances and water.

Those formulations are supposed to provide gloss, mechanical strength and resistance to spots (low water absorption) to the floor. Those properties are linked with a good film formation, which is reached by using coalescents that are able to promote the interaction into the resin particles, promoting the formation of a homogenous and resistant film.

There are two main categories of polish formulations: household polishes and institutional polishes. The difference between those two main polish formulations is the content of solids, which is higher in the case of institutional formulations.

On the other side, after certain time of use, it is necessary to remove the polish layers from the floor and apply new ones, in order to guarantee the integrity of the film, as well as its properties, already mentioned above.

Since it is quite difficult to remove the polish film without damaging the floor, especially when several layers of polish have been applied, specific polish removing formulations have been proposed in the market.

Polish remover formulations are water-based formulations usually containing surfactants, solvents, co-solvents (isopropyl alcohol), alkaline agents (Ethanolamine, NaOH) and fragrance.

The solvent contained in these polish remover formulations is important in the final application of this type of product because it impacts directly on polish remover performances, ease of use, toxicity and odor of the formulation.

Solvents are also of fundamental importance in formulations of this type, because it is the responsible to solubilize the resins present into the polish, helping the removing of it together with water and surface active agents present on the formulation.

Generally the solvent used in this application is a glycol based solvent like butyl glycol (ethylene glycol butyl ether). However, this solvent is used in a large amount in this kind of formulations, generally above 5% by weight of the polish remover composition for household polish remover, and above 25% by weight of the polish remover for institutional polish removers. In addition, butyl glycol presents the following drawbacks: it is from petrochemical source, it has strong ether-like odor, is combustible, high carbon footprint and it is harmful to humans.

In view of the above, it remains a need in the art for new solvents that are more efficient in removing polish films (in other words at lower concentrations) while offering a favorable combination of water solubility, volatility, toxicity, low odor, environmental profile and cost.

In addition, since many polish remover formulations are maintained at basic pH, there is a need for solvents that are chemically and thermally stable under basic conditions.

Further, there is an increasing need for "bio-sourced" solvents that can be used as replacements for petroleum-sourced solvents. Few bio-sourced solvents that are available can meet the increasingly demanding technical requirements for polish remover formulations. Even where such bio-sourced solvents are available, they can have various drawbacks. For example, d-limonene, which has been used as a replacement for chlorinated solvents in degreasing applications, has a strong odor, is combustible, and is classified as an irritant and sensitizer. Similarly, ethanol is a versatile solvent that is readily available from bio-based sources, but its high flammability limits its use in solvent applications. A further drawback of these solvents is that the chemical and physical properties of the solvents can only be adjusted to a limited extent.

There accordingly remains a need in the art for alternative solvents for polish remover formulations, in particular bio-sourced solvents that offer an advantageous combination of polish solubilization activity, stability under basic conditions, low odor, volatility, toxicity, environmental profile, and cost.

BRIEF DESCRIPTION OF THE INVENTION

The inventors hereof have discovered that the use of a blend of at least two glycerol ketal derivatives as solvent in polish remover formulations allows promoting polish removing performances of said formulations. The blend also has the advantage of being stable under basic conditions, having a low odor, an good volatility, no toxicity, a good environmental profile (non VOC), and low cost.

Indeed, surprisingly, it has been found that the use of the below claimed blend not only allows improving the removal of the polish film compared to pure solvents based polish remover formulations without damaging the floor.

A further advantage is that the blend ingredients are bio-sourced.

The present invention thus relates to the use of a blend comprising at least two glycerol ketal derivatives of formula I below:

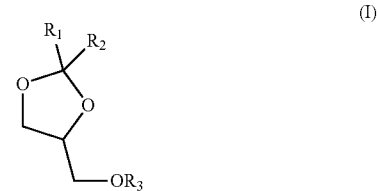

wherein

R1 and R2, independently from one another, are selected in the group consisting of: hydrogen or a linear or branched C1-C12 alkyl, a C4-C12 cycloalkyl or an aryl. R3 is H, a linear or branched alkyl, a cycloalkyl or a —C(=O)R4 group, with R4 being a linear or branched C1-C4 alkyl or a C5-C6 cycloalkyl, as solvent in polish remover formulations. The present invention is also directed to a polish remover formulation comprising a blend comprising at least two glycerol ketal derivatives of formula I below:

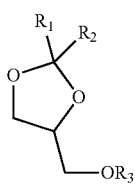

wherein

R1 and R2, independently from one another, are selected in the group consisting of: hydrogen or a linear or branched C1-C12 alkyl, a C4-C12 cycloalkyl or an aryl. R3 is H, a linear or branched alkyl, a cycloalkyl or a —C(=O)R4 group, with R4 being a linear or branched C1-C4 alkyl or a C5-C6 cycloalkyl.

DETAILED DESCRIPTION OF THE INVENTION

The present invention thus concerns the use of a blend comprising at least two glycerol ketal derivatives of formula I described above.

In a preferred embodiment, R1 and R2, independently from one another, are selected in the group consisting of: methyl, ethyl, isopropyl, n-propyl, isobutyl, n-butyl, tert-butyl, n-pentyl, cyclopentyl, cyclohexyl or phenyl.

Advantageously, in formula I above R3 is H or a —C(=O)R4 group, with R4 being methyl, ethyl, isopropyl, n-propyl, isobutyl, n-butyl or tert-butyl.

One preferred embodiment is when R1 and R2 are methyl and R3 is H. In this case, the compound is commercially available, for example under the name Augeo® Clean Multi, Augeo® SL191 or Solketal. This compound can be synthesized by reaction between glycerol and acetone, under well-known classical conditions.

In another embodiment, R1 is methyl, R2 is isobutyl and R3 is H. In this case, the compound is commercially available, for example under the name Augeo® Clean Plus. This compound can be synthesized by reaction between glycerol and methyl-isobutyl ketone, under well-known classical conditions.

In a third embodiment, R1 is methyl, R2 is phenyl and R3 is H. In this case, the compound is commercially available, for example under the name Augeo® Film HB. This compound can be synthesized by reaction between glycerol and acetophenone, under well-known classical conditions.

In a fourth embodiment, R1 is isopropyl and R2 and R3 are H. In this case, the compound is 2-isobutyl-2-methyl-1,3-dioxolane-4-methanol. This compound can be synthetized by reaction between glycerol and isobutyraldehyde, under well-known classical conditions.

Another possibility is to have R1 and R2 are methyl and R3 is a —C(=O)R4 group, with R4 being methyl. In this case, the compound is commercially available, for example under the name Augeo® ACT. This compound can be synthesized by transesterification of Solketal with an alkyl acetate under well-known classical conditions.

Still another possibility is to have R1 is 2-ethylhexyl and R2 and R3 are H. In this case, the compound is (2-(heptan-3-yl)-1,3-dioxolan-4-yl)methanol. This compound can be synthetized by reaction between glycerol and 2-ethylhexanal, under well-known classical conditions.

Glycerol can be obtained as a coproduct from biodiesel production during the transesterification of triglycerides.

The compounds of formula I have very good performance in the application, low odor and no toxicity to humans or environment. In addition, their use induces no security issues because of their high flash point.

Advantageously, the glycerol ketal derivative of formula I is chosen from the group comprising: 2,2-dimethyl-1,3-dioxolane-4-methanol, 2,2-diisobutyl-1,3-dioxolane-4-methanol, 2-isobutyl-2-methyl-1,3-dioxolane-4-methanol, 2-isopropyl-1,3-dioxolane-4-methanol, 2-butyl-2-ethyl-1,3-dioxolane-4-methanol, 2-phenyl-1,3-dioxolane-4-methanol and 2-methyl-2-phenyl-1,3-dioxolane-4-methanol, 2,2-dimethyl-1,3-dioxolane-4-acetate, (2-(heptan-3-yl)-1,3-dioxolan-4-yl)methanol and mixtures thereof.

According to a preferred embodiment, the blend can comprise from 15 to 95% by weight, preferably from 40 to 85% by weight of Augeo Clean Multi (2,2-dimethyl-1,3-dioxolane-4-methanol) based on the total weight of the blend.

Advantageously, the blend comprise from 5 to 85% by weight, preferably from 15 to 60% by weight of Augeo Clean Plus (2-isobutyl-2-methyl-1,3-dioxolane-4-methanol) based on the total weight of the blend. Alternatively, the blend can comprise from 20 to 80% by weight, preferably from 40 to 60% by weight of Augeo ACT (2,2-dimethyl-1,3-dioxolane-4-acetate) based on the total weight of the blend.

In a particular embodiment of the present invention, the blend is a mixture of 2 or 3 glycerol ketal derivatives of formula I, preferably a mixture of 2 glycerol ketal derivatives of formula I, and advantageously selected in the group consisting of: 2,2-dimethyl-1,3-dioxolane-4-methanol, 2,2-diisobutyl-1,3-dioxolane-4-methanol, 2-isobutyl-2-methyl-1,3-dioxolane-4-methanol, 2-isopropyl-1,3-dioxolane-4-methanol, 2-butyl-2-ethyl-1,3-dioxolane-4-methanol, 2-phenyl-1,3-dioxolane-4-methanol and 2-methyl-2-phenyl-1,3-dioxolane-4-methanol, 2,2-dimethyl-1,3-dioxolane-4-acetate, (2-(heptan-3-yl)-1,3-dioxolan-4-yl)methanol and mixtures thereof.

The preferred blends according to the invention are the following:

A blend of Augeo Clean Multi (2,2-dimethyl-1,3-dioxolane-4-methanol) and Augeo Clean Plus (2-isobutyl-2-methyl-1,3-dioxolane-4-methanol), preferably comprising from 15 to 95% of Augeo Clean Multi (2,2-dimethyl-1,3-dioxolane-4-methanol) and from 5 to 85% of Augeo Clean Plus (2-isobutyl-2-methyl-1,3-dioxolane-4-methanol), and even more preferably a blend comprising from 40 to 85% of Augeo Clean Multi (2,2-dimethyl-1,3-dioxolane-4-methanol) and from 15 to 60% of Augeo Clean Plus (2-isobutyl-2-methyl-1,3-dioxolane-4-methanol).

A blend of Augeo Clean Multi (2,2-dimethyl-1,3-dioxolane-4-methanol) and Augeo ACT (2,2-dimethyl-1,3-dioxolane-4-acetate), preferably comprising from 20 to 80% of Augeo Clean Multi (2,2-dimethyl-1,3-dioxolane-4-methanol) and from 20 to 80% of Augeo ACT (2,2-dimethyl-1,3-dioxolane-4-acetate), and even more preferably a blend comprising from 40 to 60% of Augeo Clean Multi (2,2-dimethyl-1,3-dioxolane-4-methanol) and from 40 to 60% of Augeo ACT (2,2-dimethyl-1,3-dioxolane-4-acetate).

The above % are in % by weight based on the total weight of the blend.

According to a particular embodiment, the blend consists in Augeo Clean Multi (2,2-dimethyl-1,3-dioxolane-4-methanol) and Augeo Clean Plus (2-isobutyl-2-methyl-1,3-dioxolane-4-methanol). In other words, Augeo Clean Multi (2,2-dimethyl-1,3-dioxolane-4-methanol) and Augeo Clean Plus (2-isobutyl-2-methyl-1,3-dioxolane-4-methanol) are the sole components of the blend.

The use according to the invention allows promoting the polish removing performances of polish remover formulations, notably when compared to a polish remover formulation containing a single glycerol ketal of formula I instead of at least two glycerol ketal.

The present invention also concerns a polish remover formulation comprising the above described blend comprising at least two glycerol ketal derivatives of formula I. All the preferred embodiments detailed before, taken alone or in combination are also applicable to the polish remover composition.

The polish remover composition according to the invention advantageously comprises from 0.5 to 50% by weight of the blend, preferably from 10 to 40% by weight based on the total weight of the polish remover formulation.

The polish remover formulation of the invention generally further comprises at least one of the following components:
 a. a surfactant,
 b. a basifying agent,
 c. a co-solvent,
 d. a fragrance,
 e. water.

In a preferred embodiment of the invention, the polish remover formulation comprises at least 50%, preferably at least 75% and even more preferably at least 90% by weight of water based on the total weight of the polish removing formulation.

In any case, the amount of water is the amount that is necessary to achieve 100% of the weight of the formulations of the present invention.

The surfactant is generally selected in the group consisting of anionic, cationic, non-ionic, hydrotope and amphoteric surfactants. In particular, it can be chosen among the following components: alkylamine oxides, alkylphenol ethoxylates, linear and branched alcohol ethoxylates, alkylbetaines, primary amine salts, diamine salts, quaternary ammonium salts, carboxylic acid salts, alkylbenzene sulfonates, alkylbenzenesulfonic acid, olefin sulfonates, alkyl sulfates and others. It is generally present in an amount varying from 0.5 to 20% by weight of the polish remover formulation.

The basifying agent is generally selected in the group consisting of amines or hydroxides, notably sodium hydroxide or potassium hydroxide. It is generally present in an amount varying from 2 to 15% by weight of the polish remover formulation.

The co-solvent is generally selected in the group consisting of alcohols, notably ethanol, isopropanol or butanol. It is generally present in an amount varying from 5 to 20% by weight of the polish remover formulation.

The fragrance is generally present in an amount varying from 0.25 to 2% by weight of the polish remover formulation.

Further additives can be added to the formulation like chelating agents, anti-corrosion agents, fungicides, thickeners, anti-foam agents and others. The total amount of further additives generally remains below 15% by weight of the polish remover formulation.

Specific language is used in the description so as to facilitate the understanding of the principle of the invention. It should, however, be understood that no limitation of the scope of the invention is envisaged by the use of this specific language. Modifications, improvements and perfections may especially be envisaged by a person skilled in the technical field concerned, on the basis of his own general knowledge.

The term "and/or" includes the meanings "and", "or" and also all the other possible combinations of elements connected to this term.

Other details or advantages of the invention will emerge more clearly in the light of the examples given below, purely for indicative purposes.

EXPERIMENTAL SECTION

1. Preparation of the Blends

Blends of Augeo Clean Multi (2,2-dimethyl-1,3-dioxolane-4-methanol) and Augeo Clean Plus (2-isobutyl-2-methyl-1,3-dioxolane-4-methanol) are prepared by simple mixing the components in a recipient. Both Augeo Clean Multi (2,2-dimethyl-1,3-dioxolane-4-methanol) and Augeo Clean Plus (2-isobutyl-2-methyl-1,3-dioxolane-4-methanol) are commercially available, sold by Rhodia Poliamida E Especialidades Ltda.

2. Preparation of the Polish Remover Formulations

The polish remover formulations were prepared by mixing each of the components listed above in table 1:

TABLE 1

| Components | Polish remover A | Polish Remover B | Polish Remover C |
|---|---|---|---|
| NaOH 50% | 7.20 | 7.20 | 7.20 |
| Renex 95 | 1.00 | 1.00 | 1.00 |
| EDTA 40% | 0.23 | 0.23 | 0.23 |
| Augeo Clean Plus | 30.00 | — | — |
| Augeo Clean Multi | — | 30.00 | — |
| Blend 80% Augeo Clean Multi + 20% Augeo Clean Plus | — | — | 30.00 |
| Sodium Toluene Sulfonate | 6.00 | 6.00 | 6.00 |
| Water | 55.57 | 55.57 | 55.57 |
| TOTAL | 100.00 | 100.00 | 100.00 |

The polish remover A with Augeo Clean Plus, due to its water solubility, turns into a cloudy solution, that is not adequate and stable enough to be tested at the application.

The solvent used at Polish Remover C is the mixture of 80% Augeo Clean Multi and 20% Augeo Clean Plus prepared by mixing as explained above.

3. Polish Removing Methodology 3.1. Substrate

The substrate used was black paviflex (vinyl flooring) with dimensions of 15 cm×15 cm.

3.2. Polish Application

It was applied to the paviflex two layers of professional sealing and other five layers of polish, with at least 1 hr of difference between each application, so there was time enough to film formation. The material used to apply those layers was cotton, applied first in cycles than in vertical lines, so the polish could be uniformly distributed at the paviflex.

For each layer applied, the gloss was measured using gloss meter equipment, according with ASTM-1455.

3.3. Polish Removing

To reproduce the floor polisher that is normally used to remove polishes from the floor, it was used a Gardner equipment and a Scoth Brite (3M) sponge with dimensions 4.2 cm×7.4 cm. One cycle correspond to two times that the sponge has passed through the paviflex. For this evaluation it was applied 5 mL of the polish remover at the sponge and it was stipulated 150 cycles to evaluate its performance.

At one side of the paviflex it was applied Polish Remover B, and on the other side the Polish Remover C, so it was possible to compare both performances.

3.4. Performance Evaluation

The performance was evaluated by the gloss measurement after removing the polish. The lower the gloss, the better the hability of the product on removing polish, so the better the performance. Table 2 below shows the gloss results after 150 cycles for four different paviflex where the polish removers mentioned above where applied.

TABLE 2

| Components | Polish Remover B | Polish Remover C |
|---|---|---|
| Paviflex 1 - 20° | 14.7 | 11.9 |
| 60° | 43.5 | 37.7 |
| 80° | 38.2 | 38.2 |
| Paviflex 2 - 20° | 7.7 | 4.0 |
| 60° | 33.4 | 19.7 |
| 80° | 40.5 | 25.7 |
| Paviflex 3 - 20° | 7.3 | 6.8 |
| 60° | 33.6 | 30.8 |
| 80° | 33.9 | 33.5 |
| Paviflex 4 - 20° | 9.9 | 7.9 |
| 60° | 36.8 | 29.4 |
| 80° | 37.5 | 34.0 |

As the table above shows, the paviflex gloss after removing the polish with Polish Remover C is lower than with Polish Remover B, which means that the blend of solvents removes the polish better than Augeo Clean Multi alone.

The invention claimed is:

1. A method for promoting the polish removing performance of a polish remover formulation, comprising including a blend comprising at least two glycerol ketal derivatives of formula I below:

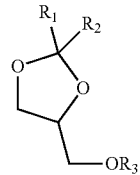

wherein:
R1 and R2, independently from one another, are selected in the group consisting of: hydrogen or a linear or branched C1-C12 alkyl, a C4-C12 cycloalkyl or an aryl, and
R3 is H, a linear or branched alkyl, a cycloalkyl or a C(=O)R4 group, with R4 being a linear or branched C1-C4 alkyl or a C5-C6 cycloalkyl,
as solvent in the polish remover formulation, wherein the formulation also comprises water.

2. A method according to claim 1, wherein R1 and R2, independently from one another, are selected in the group consisting of methyl, ethyl, isopropyl, n-propyl, isobutyl, n-butyl, tert-butyl, n-pentyl, cyclopentyl, cyclohexyl, and phenyl.

3. A method according to claim 1, wherein R3 is H or a C(=O)R4 group, and R4 is methyl, ethyl, isopropyl, n-propyl, isobutyl, n-butyl, or tert-butyl.

4. A method according to claim 1, wherein the blend is a mixture of 2 or 3 glycerol ketal derivatives of formula I.

5. A method according to claim 1, wherein the blend is a mixture of 2 glycerol ketal derivatives selected in the group consisting of 2,2-dimethyl-1,3-dioxolane-4-methanol, 2,2-diisobutyl-1,3-dioxolane-4-methanol, 2-isobutyl-2-methyl-1,3-dioxolane-4-methanol, 2-isopropyl-1,3-dioxolane-4-methanol, 2-butyl-2-ethyl-1,3-dioxolane-4-methanol, 2-phenyl-1,3-dioxolane-4-methanol and 2-methyl-2-phenyl-1,3-dioxolane-4-methanol, 2,2-dimethyl-1,3-dioxolane-4-acetate, (2-(heptan-3-yl)-1,3-dioxolan-4-yl)methanol, and mixtures thereof.

6. A method according to claim 1, wherein the blend is a mixture of 2,2-dimethyl-1,3-dioxolane-4-methanol and 2-isobutyl-2-methyl-1,3-dioxolane-4-methanol.

* * * * *